US012774884B1

(12) United States Patent
Hailey et al.

(10) Patent No.: US 12,774,884 B1
(45) **Date of Patent: *Oct. 27, 2026**

(54) TRACK GEOMETRY INSPECTION

(71) Applicant: Norfolk Southern Corporation, Atlanta, GA (US)

(72) Inventors: Richard Scott Hailey, Atlanta, GA (US); Michael Gerard Allran, Atlanta, GA (US)

(73) Assignee: Norfolk Southern Corporation, Atlanta, GA (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/924,818

(22) Filed: Oct. 23, 2024

Related U.S. Application Data

(63) Continuation of application No. 17/686,882, filed on Mar. 4, 2022, now Pat. No. 12,158,333.

(60) Provisional application No. 63/156,532, filed on Mar. 4, 2021.

(51) Int. Cl.

| | |
|---|---|
| ***G01B 11/24*** | (2006.01) |
| ***B61K 9/08*** | (2006.01) |
| ***G01P 3/481*** | (2006.01) |
| ***G01S 19/49*** | (2010.01) |

(52) U.S. Cl.
CPC ................ *G01B 11/24* (2013.01); *B61K 9/08* (2013.01); *G01P 3/481* (2013.01); *G01S 19/49* (2013.01)

(58) Field of Classification Search
CPC ........... G01B 11/24; B61K 9/08; G01P 3/481; G01S 19/49; B61L 23/04; B61L 23/042; G01N 21/88
See application file for complete search history.

(56) References Cited

U.S. PATENT DOCUMENTS

| | | | | |
|---|---|---|---|---|
| 10,589,763 B2 * | 3/2020 | Buerger | ................. | G01C 11/06 |
| 2007/0213926 A1 * | 9/2007 | Jager | ........................ | E01B 35/00 701/33.1 |
| 2017/0106885 A1 * | 4/2017 | Singh | ..................... | B61L 23/045 |
| 2018/0222504 A1 * | 8/2018 | Birch | ..................... | B61L 23/044 |
| 2018/0222505 A1 * | 8/2018 | Chung | ................ | B61L 15/0027 |
| 2018/0339720 A1 * | 11/2018 | Singh | ....................... | G06T 7/001 |

FOREIGN PATENT DOCUMENTS

| | | | |
|---|---|---|---|
| EP | 1766329 B1 * | 2/2017 | ............... B61K 9/08 |

* cited by examiner

*Primary Examiner* — Abdullahi Nur
(74) *Attorney, Agent, or Firm* — Bradley Arant Boult Cummings LLP; Daniel E. Sineway, Esq.

(57) ABSTRACT

Systems and methods for track inspection are discussed herein. One or more imaging devices of a track profile sensor assembly can be positioned to capture images of a track. The track profile sensor assembly can be enclosed within a weather-resistant structure. An inertial measurement unit of the track profile sensor assembly can detect motion data associated with a rail vehicle. A geolocation sensor can determine a current location of the rail vehicle. A track geometry evaluator can determine a current track profile based at least in part on one or more captured images, the motion data associated with the rail vehicle, and the current location.

21 Claims, 12 Drawing Sheets

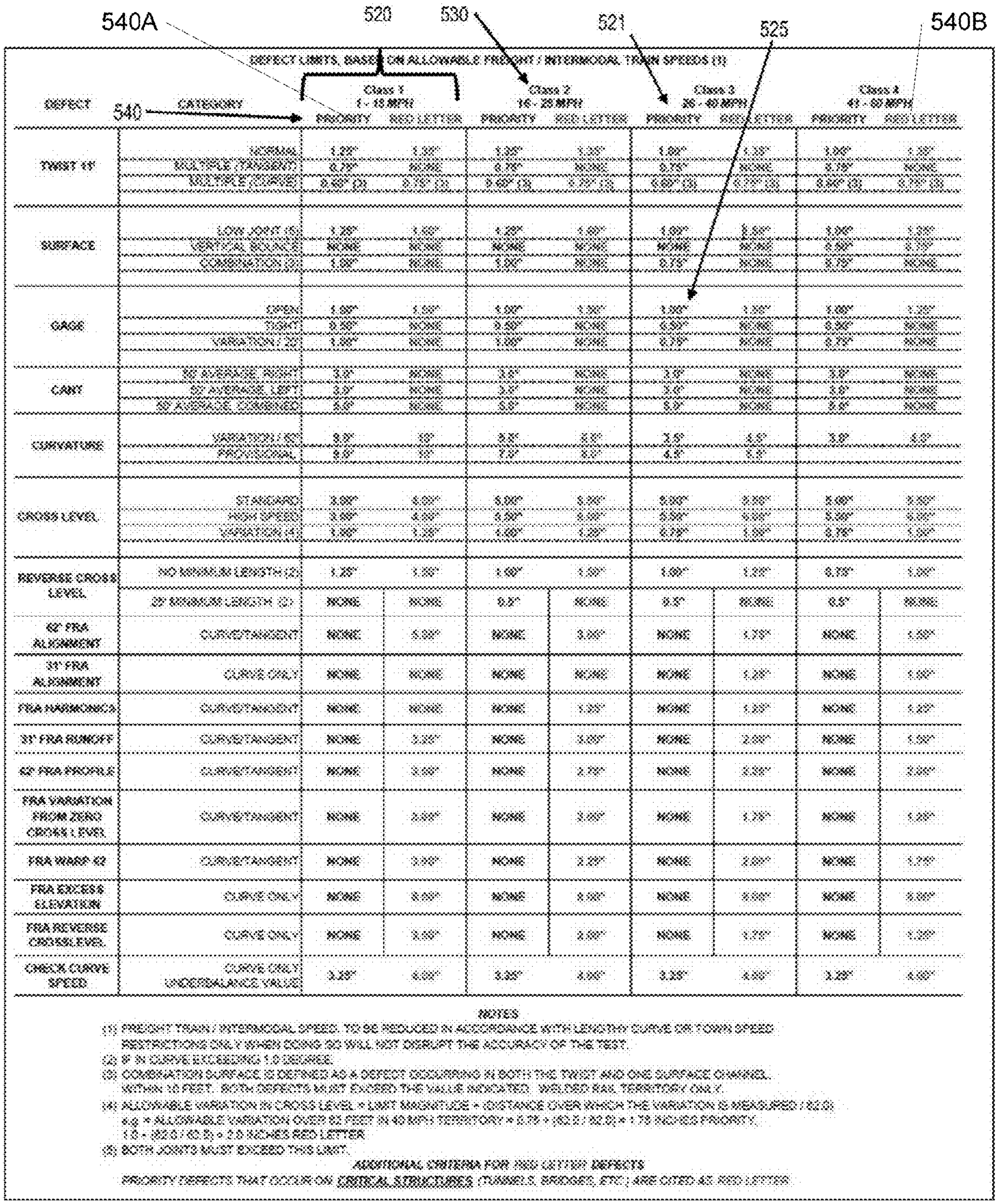

DEFECT LIMITS, BASED ON ALLOWABLE FREIGHT / INTERMODAL TRAIN SPEEDS (1)

| DEFECT | CATEGORY | Class 1 1 - 15 MPH PRIORITY | Class 1 1 - 15 MPH RED LETTER | Class 2 16 - 25 MPH PRIORITY | Class 2 16 - 25 MPH RED LETTER | Class 3 26 - 40 MPH PRIORITY | Class 3 26 - 40 MPH RED LETTER | Class 4 41 - 60 MPH PRIORITY | Class 4 41 - 60 MPH RED LETTER |
|---|---|---|---|---|---|---|---|---|---|
| TWIST 11' | NORMAL | 1.25" | 1.50" | 1.25" | 1.35" | 1.00" | 1.35" | 1.00" | 1.50" |
| | MULTIPLE (TANGENT) | 0.75" | NONE | 0.75" | NONE | 0.75" | NONE | 0.75" | NONE |
| | MULTIPLE (CURVE) | 3.60" (3) | 2.75" (3) | 3.60" (3) | 2.75" (3) | 0.60" (3) | 2.75" (3) | 3.60" (3) | 2.75" (3) |
| SURFACE | LOW JOINT (5) | 1.25" | 1.50" | 1.25" | 1.50" | 1.00" | 2.50" | 1.00" | 1.25" |
| | VERTICAL BOUNCE | NONE | NONE | NONE | NONE | NONE | NONE | 0.50" | 0.75" |
| | COMBINATION (3) | 1.00" | NONE | 1.00" | NONE | 0.75" | NONE | 0.75" | NONE |
| GAGE | OPEN | 1.00" | 1.50" | 1.00" | 1.50" | 1.00" | 1.50" | 1.00" | 1.25" |
| | TIGHT | 0.50" | NONE | 0.50" | NONE | 0.50" | NONE | 0.50" | NONE |
| | VARIATION / 20' | 1.00" | NONE | 1.00" | NONE | 0.75" | NONE | 0.75" | NONE |
| CANT | 50' AVERAGE, RIGHT | 3.0" | NONE | 3.0" | NONE | 3.0" | NONE | 3.0" | NONE |
| | 50' AVERAGE, LEFT | 3.0" | NONE | 3.0" | NONE | 3.0" | NONE | 3.0" | NONE |
| | 50' AVERAGE, COMBINED | 5.0" | NONE | 5.0" | NONE | 5.0" | NONE | 5.0" | NONE |
| CURVATURE | VARIATION / 62' | 8.5" | 10" | 5.5" | 6.0" | 3.5" | 4.5" | 3.0" | 4.0" |
| | PROVISIONAL | 9.0" | 12" | 7.0" | 8.0" | 4.5" | 5.5" | | |
| CROSS LEVEL | STANDARD | 3.00" | 4.00" | 3.00" | 3.50" | 3.00" | 3.50" | 3.00" | 3.50" |
| | HIGH SPEED | 3.00" | 4.00" | 4.50" | 5.00" | 3.50" | 5.00" | 3.00" | 5.00" |
| | VARIATION (4) | 1.00" | 1.25" | 1.00" | 1.25" | 0.75" | 1.00" | 0.75" | 1.00" |
| REVERSE CROSS LEVEL | NO MINIMUM LENGTH (2) | 1.25" | 1.50" | 1.00" | 1.50" | 1.00" | 1.25" | 0.75" | 1.00" |
| | 25' MINIMUM LENGTH (2) | NONE | NONE | 0.5" | NONE | 0.5" | NONE | 0.5" | NONE |
| 62' FRA ALIGNMENT | CURVE/TANGENT | NONE | 5.00" | NONE | 3.00" | NONE | 1.75" | NONE | 1.50" |
| 31' FRA ALIGNMENT | CURVE ONLY | NONE | NONE | NONE | NONE | NONE | 1.25" | NONE | 1.00" |
| FRA HARMONICS | CURVE/TANGENT | NONE | NONE | NONE | 1.25" | NONE | 1.25" | NONE | 1.25" |
| 31' FRA RUNOFF | CURVE/TANGENT | NONE | 3.50" | NONE | 3.00" | NONE | 2.00" | NONE | 1.50" |
| 62' FRA PROFILE | CURVE/TANGENT | NONE | 3.50" | NONE | 2.75" | NONE | 2.25" | NONE | 2.00" |
| FRA VARIATION FROM ZERO CROSS LEVEL | CURVE/TANGENT | NONE | 3.00" | NONE | 2.00" | NONE | 1.75" | NONE | 1.25" |
| FRA WARP 62 | CURVE/TANGENT | NONE | 3.00" | NONE | 2.25" | NONE | 2.00" | NONE | 1.75" |
| FRA EXCESS ELEVATION | CURVE ONLY | NONE | 8.00" | NONE | 8.00" | NONE | 8.00" | NONE | 8.00" |
| FRA REVERSE CROSSLEVEL | CURVE ONLY | NONE | 3.00" | NONE | 2.00" | NONE | 1.75" | NONE | 1.25" |
| CHECK CURVE SPEED | CURVE ONLY UNDERBALANCE VALUE | 3.25" | 4.00" | 3.25" | 4.00" | 3.25" | 4.00" | 3.25" | 4.00" |

NOTES (1) FREIGHT TRAIN / INTERMODAL SPEED. TO BE REDUCED IN ACCORDANCE WITH LENGTHY CURVE OR TOWN SPEED RESTRICTIONS ONLY WHEN DOING SO WILL NOT DISRUPT THE ACCURACY OF THE TEST.
(2) IF IN CURVE EXCEEDING 1.0 DEGREE.
(3) COMBINATION SURFACE IS DEFINED AS A DEFECT OCCURRING IN BOTH THE TWIST AND ONE SURFACE CHANNEL WITHIN 10 FEET. BOTH DEFECTS MUST EXCEED THE VALUE INDICATED. WELDED RAIL TERRITORY ONLY.
(4) ALLOWABLE VARIATION IN CROSS LEVEL = LIMIT MAGNITUDE + (DISTANCE OVER WHICH THE VARIATION IS MEASURED / 62.0)
e.g. = ALLOWABLE VARIATION OVER 82 FEET IN 40 MPH TERRITORY = 0.75 + (82.0 / 62.0) = 1.75 INCHES PRIORITY.
1.0 + (82.0 / 62.0) = 2.0 INCHES RED LETTER
(5) BOTH JOINTS MUST EXCEED THIS LIMIT.

ADDITIONAL CRITERIA FOR RED LETTER DEFECTS

PRIORITY DEFECTS THAT OCCUR ON CRITICAL STRUCTURES (TUNNELS, BRIDGES, ETC.) ARE CITED AS RED LETTER

FIG. 11

TRACK GEOMETRY INSPECTION

CROSS-REFERENCE TO RELATED APPLICATIONS

This application is a continuation of, and claims the benefit of and priority to, U.S. patent application Ser. No. 17/686,882, filed Mar. 4, 2022, and entitled, "Track Geometry Inspection," which claims the benefit of, and priority to, U.S. Provisional Application No. 63/156,532, filed Mar. 4, 2021, and entitled "Track Geometry Inspection System Onboard a Locomotive in Service," the disclosures of which are hereby incorporated by reference as if fully set forth herein.

TECHNICAL FIELD

Examples set forth in the present disclosure relate generally to railway maintenance systems and, more particularly, to systems for inspecting railway track geometry from an in-service locomotive traveling at track speeds.

BACKGROUND

Modern railway tracks include a pair of rails attached by fasteners to laterally oriented railroad ties that are supported by ballast and a prepared subgrade. The rails run parallel and are spaced apart by a distance referred to as the track gauge.

Track geometry refers to the three-dimensional distances between track elements. Normal decay, environmental conditions, and general deterioration of the railway produces changes in track geometry over time. Moreover, locomotives pulling trains of rail cars generate significant forces on railway track. Defects or anomalies in track geometry can generate hazardous eccentric loads, rapid wear conditions, part failures, and accidents, including derailment.

Regular inspection of track geometry is both desirable for safety and typically required by local government regulations. In the U.S., the Federal Railroad Administration (FRA) issues federal regulations that require periodic inspection of railways to ensure safety. The FRA track safety standards set forth the minimum safety requirements for railroad operations, including road bed construction, track geometry, track structure, and inspections.

Qualified inspectors may conduct visual inspections, either on foot or from slow-moving vehicles such as hi-rail trucks. Specialized track geometry cars pulled by a dedicated locomotive may be dispatched to travel along select sections and inspect track geometry with a variety of sensors. Hi-rail trucks and geometry cars occupy segments of track for hours or days, interfering with scheduled service. Neither a hi-rail truck nor a single geometry car can match the accumulated forces and loads generated by high-tonnage, multi-car freight or passenger trains which are in service and traveling at track speeds.

Therefore, there is a long-felt but unresolved need for a system or method that can measure track geometry during realistic force exertions on particular rail systems.

BRIEF SUMMARY OF THE DISCLOSURE

Briefly described, and according to one embodiment, aspects of the present disclosure generally relate to systems and methods for measuring railway track geometry while exerting realistic forces on the measured track and producing an alert based on the gathered data. In various embodiments, the track inspection system is a multifaceted tool that interacts with a fully operational locomotive to measure the track geometry of a railway track.

The track inspection system can include onboard computing systems, onboard camera systems, an internal measurement unit (IMU), a weather enclosure, a transceiver for wireless communications, a remote server, and a locomotive. In at least one embodiment, the camera systems and the IMU can attach into a weather enclosure that protects the components of the system from adverse weather conditions. The weather enclosure, camera systems, and the IMU can be fixed to the undercarriage of the locomotive. In various embodiments, as the locomotive progresses over the railway track, the track inspection system actively gathers data relative to the track. For example, the camera systems and the IMU can include laser cameras and accelerometers that take high quality photos of the railway track and measure the acceleration of the locomotive, respectively. The track inspection system can record data produced by the track inspection sensors for further processing.

Once data is recorded, the onboard components of the track inspection system can distribute and/or analyze the data. In particular embodiments, the onboard components of the track inspection system can send the recorded data to the server. The server and the onboard computing systems can perform similar data analytics on the recorded data. In some embodiments, the track inspection system analyzes the recorded data and assigns the recorded data to a track profile. The track inspection system can compare the analyzed track profile to known defect data stored in a remote and/or onboard data storage system. By comparing the known defect data with a corresponding severity to the analyzed track profile, the track inspection system can determine the severity of any recorded defects present in the track profile. Based on the severity, the track inspection system can produce an alert specifying the defect type, the severity, location information of the recorded defect, and other information relative to the recorded defect data. The track inspection system can send the alert to crew onboard the locomotive, dispatcher, field personnel, or any other pertinent system and/or individual.

To maintain the safety of the camera systems, the IMU, and other onboard systems, the track inspection system can include a weather enclosure. The weather enclosure can protect vital components of the track inspection system from debris and other adverse weather conditions. For example, the weather enclosure can produce an airstream over the camera systems. Continuing this example, the airstream can push any debris moving towards the camera systems away from the sensors. In some embodiments, the weather enclosure can prolong the longevity of the track inspection system.

According to a first aspect, a track inspection method comprising: A) positioning a pair of cameras of a track profile sensor assembly with a pair of lenses oriented toward a track, the track profile sensor assembly being enclosed within a weather-resistant structure; B) detecting, via an inertial measurement unit of the track profile sensor assembly, motion data associated with a locomotive; C) determining, via a geospatial position and orientation circuit, a current location of the locomotive; D) capturing, via the pair of cameras, a plurality of images of the track; and E) determining, via a track geometry evaluator, a current track profile based on the plurality of images, the motion data associated with the locomotive, and the current location.

According to a further aspect, the track inspection system of the first aspect or any other aspect, further comprising generating, via at least one computing device, a three-dimensional representation of the track, wherein the current track profile is determined based on the three-dimensional representation of the track.

According to a further aspect, the track inspection system of the first aspect or any other aspect, further comprising analyzing, via at least one computing device, the motion data associated with the locomotive to determine at least one element of the current track profile.

According to a further aspect, the track inspection system of the first aspect or any other aspect, wherein the at least one element comprises at least one of: a cant angle, a cross level, a warp, a grade, or a curve.

According to a further aspect, the track inspection system of the first aspect or any other aspect, further comprising: A) measuring, via a velocity sensor, a measurement of a current velocity of the locomotive; B) determining, via at least one computing device, a current speed class based on the current velocity of the locomotive; C) identifying, via at least one computing device, a particular set of predefined track defect limits of a plurality of sets of predefined track defect limits based on the current speed class, wherein the plurality of sets of track defect limits are individually associated with a respective speed class and a respective urgency value; and D) generating, via the at least one computing device, an alarm signal in response to determining that one or more elements of the current track profile exceeds a corresponding limit associated with the particular set of predefined track defect limits.

According to a further aspect, the track inspection system of the first aspect or any other aspect, further comprising directing, via an air curtain in pneumatic communication with a compressed air source, a flow of air between the pair of cameras and the track to inhibit contaminants from entering an area occupied by the pair of cameras.

According to a second aspect, a track inspection system comprising: A) a track profile sensor assembly enclosed within a weather-resistant structure and comprising: 1) a pair of camera devices positioned to capture images of a track, and 2) an inertial measurement unit configured to detect motion data associated with a locomotive; B) an air curtain in pneumatic communication with a compressed air source and configured to direct a flow of air between the pair of camera devices and the track; C) a geospatial position and orientation circuit configured to determine a current location of the locomotive; D) at least one computing device comprising a transceiver, a processor, and a memory, wherein the at least one computing device is in communication with the track profile sensor assembly and the geospatial position and orientation circuit and is configured to: 1) be supported by the locomotive riding on a railway track; 2) read at least one image from the pair of camera devices; and 3) determine a current track profile based on the at least one image and the motion data.

According to a further aspect, the train inspection system of the second aspect or any other aspect, wherein the track inspection system is configured to receive power from a generator of the locomotive.

According to a further aspect, the train inspection system of the second aspect or any other aspect, further comprising: A) a velocity sensor configured to measure a current velocity of the locomotive; and B) a data store in communication with the at least one computing device and comprising a plurality of sets of predefined track defect limits, wherein each set is associated with a speed class and an urgency value, wherein the at least one computing device is in communication with the velocity sensor and further configured to: 1) determine a current speed class based on a measured current velocity of the locomotive; 2) select a current set of predefined track defect limits associated with the current speed class from the plurality of sets of predefined track defect limits; and 3) generate an alarm signal in response to determining that one or more elements of the current track profile exceeds a corresponding limit associated with the current set of predefined track defect limits.

According to a further aspect, the train inspection system of the second aspect or any other aspect, wherein the at least one computing device is further configured to: A) generate a rail profile based on the at least one image; and B) determine the current track profile further based on the rail profile.

According to a further aspect, the train inspection system of the second aspect or any other aspect, wherein each of the pair of camera devices comprises a respective laser projector positioned to project a laser reference line onto a rail and a respective camera positioned to capture the laser reference line at a known distance and triangulation angle relative to the respective laser projector.

According to a further aspect, the train inspection system of the second aspect or any other aspect, wherein the weather-resistant structure comprises: A) a rear plate defining a pair of slots sized and shaped to receive a pair of supports extending from a mounting bracket attached to the locomotive; B) a central floor for supporting the inertial measurement unit; C) a side floor, a side wall, and a block for supporting the respective camera of each of the pair of camera devices, wherein the side wall comprises an angled portion and a second orthogonal portion, D) wherein the angled portion defines at least one camera opening that is aligned with the respective camera for at least one of the pair of camera devices, and E) wherein the second orthogonal portion defines at least one laser opening that is aligned with the respective laser projector for at least one of the pair of camera devices; F) a camera recess defined by the angled portion and the block; G) a laser recess defined by the second orthogonal portion and the block; and H) a plenum defining an air outlet for the air curtain, wherein the air outlet is sized and shaped to direct the flow of air across the camera recess.

According to a third aspect, a method for generating an alarm signal, comprising: A) capturing, via at least one camera system, at least one image of a railway track; B) detecting, via an inertial measurement unit, motion data associated with a locomotive; C) determining, via at least one computing device, a current track profile based on the at least one image and the motion data; D) storing, via at least one computing device and in a memory, a plurality of track defect limit sets associated with a speed class and a priority value; E) determining, via at least one computing device, a current speed class of the locomotive based on the motion data of the locomotive; F) selecting, via at least one computing device, a particular defect limit set of the plurality of track defect limit sets based on the current speed class of the locomotive; and G) generating, via at least one computing device, an alarm signal in response to determining that at least one element of the current track profile exceeds the particular defect limit set.

According to a further aspect, the method of the third aspect or any other aspect, wherein determining the current track profile comprises: A) identifying, via the at least one computing device, a visual representation of the railway track in the at least one image; and B) generating, via the at least one computing device, a three-dimensional representation of the railway track based on the visual representation.

According to a further aspect, the method of the third aspect or any other aspect, further comprising identifying, via the at least one computing device, damage to a portion of the railway based on the visual representation and the motion data.

According to a further aspect, the method of the third aspect or any other aspect, wherein the at least one image was captured, the motion data was detected, and the current speed class was determined at a particular time.

According to a further aspect, the method of the third aspect or any other aspect, further comprising: A) determining a plurality of current track profiles over a period of time while the locomotive is in motion; and B) storing the plurality of current track profiles associated with a respective time and a respective location for which each current track profile of the plurality of current track profiles was determined.

According to a further aspect, the method of the third aspect or any other aspect, further comprising iteratively performing, during a train ride, the steps of: A) determining, via at least one computing device, a current iteration speed class of the locomotive; B) selecting, via at least one computing device, a current iteration defect limit set of the plurality of track defect limit sets based on the current iteration speed class of the locomotive; and C) if at least one current iteration element of a current iteration track profile exceeds the current iteration defect limit set, generating the alarm signal.

According to a further aspect, the method of the third aspect or any other aspect, further comprising positioning a lens of the at least one camera system between eight and ten inches in front of a contact point between the locomotive and the railway track.

According to a further aspect, the method of the third aspect or any other aspect, further comprising determining, via a geospatial position and orientation circuit, a current location of the locomotive corresponding to where the at least one image and the motion data were captured, wherein generating the alarm signal comprises generating, via at least one computing device, an overlay for a map of the rail system comprising an indicator at the current location of the locomotive.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 11 illustrates a table showing a plurality of example sets of predefined track defect limits, according to one embodiment of the present disclosure;

DETAILED DESCRIPTION

Figure 1:
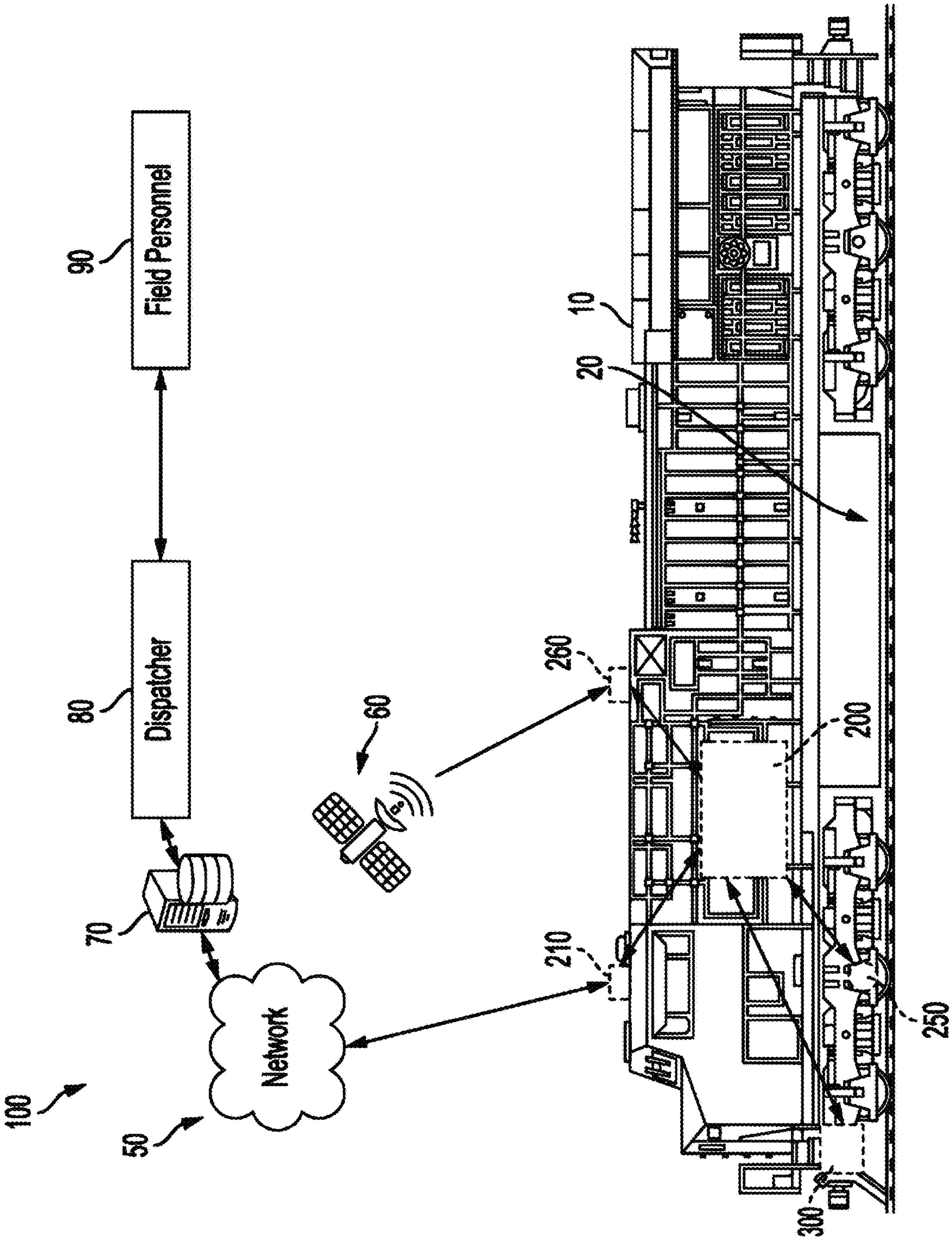
FIG. 1 illustrates a train inspection system, according to one embodiment of the present disclosure.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for an exemplary track inspection system supported by a locomotive on a railway track. The system can include a data acquisition system. The data acquisition system can include a transceiver, a processor, and a memory. The data acquisition system can be in communication with a track profile sensor assembly, an air curtain, a geospatial position and orientation system, and a track geometry evaluator. The geospatial position and orientation system can include circuitry to triangulate a global positioning location. The track profile sensor assembly can be supported within a weather-resistant enclosure. The weather-resistant enclosure can be referred to as a weather-resistant structure. The track profile sensor can include a pair of camera systems (also referred to herein as camera devices) positioned to capture images of the track and an inertial measurement unit for detecting motion data associated with the locomotive. The air curtain can be in pneumatic communication with a compressed air source and can be configured to direct a flow of air between the camera systems and the track. The geospatial position and orientation system can determine a current location of the locomotive. The track geometry evaluator can determine a current track profile based on the captured images and the detected motion data.

The track inspection system can include a velocity sensor. The velocity sensor can measure a current velocity of the locomotive and a plurality of sets of predefined track defect limits (e.g., as shown in FIG. 11). In some embodiments, the sets of predefined track defect limits is associated with a speed class and an urgency value. The track geometry evaluator can be configured to determine a current speed class based on the measured current velocity, select a current set of predefined track defect limits associated with the current speed class, and generate an alarm signal in response to determining that one or more elements of the current track profile exceeds a corresponding limit associated with the selected current set of predefined track defect limits.

Although the various example and implementations are described with reference to a system for inspecting railway track, the systems and methods described herein may be applied to and used with any of a variety of systems, especially those for monitoring and remotely controlling a large number of machines or equipment distributed over a wide network with precision and reliability.

Exemplary Embodiments

Referring now to the figures, for the purposes of example and explanation of the fundamental processes and components of the disclosed systems and processes, reference is made to FIG. 1, which illustrates a train inspection system 100, according to one or more embodiments. As will be understood and appreciated, the train inspection system 100 shown in FIG. 1 represents merely one approach or embodiment of the present system, and other aspects are used according to various embodiments of the present system.

In various embodiments the train inspection system 100 can include a locomotive 10 and a railway track 20. The locomotive 10 traveling on a railway track 20 can support particular components of the train inspection system 100. For example, the various components of the train inspection system 100 can be fixed to the locomotive 10. Some components of the train inspection system 100 can be located at remote locations and wirelessly communicate with the components of the train inspection system 100 fixed to the locomotive 10. The train inspection system 100 can include a track profile sensor assembly 300 and a data acquisition system 200 in communication over a network 50 with a remote server 70, a dispatcher 80, and field personnel 90.

The network 50 may include a public network, such as the internet, or a private network, such as a privately controlled wide-area network (WAN), or a combination of public and private networks. For example, the network 50 can include, for example, the Internet, intranets, extranets, local area networks (LANs), wired networks, wireless networks, or other suitable networks, etc., or any combination of two or more such networks. For example, such networks can include satellite networks, cable networks, Ethernet networks, Bluetooth networks, Wi-Fi networks, NFC networks, and other types of networks.

The server 70 may be protected by firewalls and other network segmentation arrangements to improve security and support performance. The server 70 can include, for example, a server computer or any other system providing computing capability. Alternatively, the server 70 can employ more than one computing devices that can be arranged, for example, in one or more server banks or computer banks or other arrangements. Such computing devices can be located in a single installation or can be distributed among many different geographical locations. For example, the server 70 can include one or more computing devices that together can include a hosted computing resource, a grid computing resource and/or any other distributed computing arrangement. In some cases, the server 70 can correspond to an elastic computing resource where the allotted capacity of processing, network, storage, or other computing-related resources can vary over time.

In some embodiments, the server 70 includes an application referred to as a track geometry evaluator 1045, as described herein, which can be configured to determine a current track profile based on data gathered and transmitted by the data acquisition system 200. The current track profile can correspond to data collected for a particular segment of a railway track. In some embodiments, the current track profile can include image captures of the segment of a railway track, two-dimensional or three-dimensional representations of the segment of a railway track, motion data associated with movement over the railway track, temperature and humidity values associated with the segment of railway track, audio captured while traveling over the segment of a railway track, pathing information corresponding to the segment of a railway track, location information for the segment of a railway track, velocity of travel while passing over the segment of a railway track, and potentially other information. The server 70 can include a processor for executing instructions and a memory for storing instructions (e.g., applications, software programs). The server 70 can access one or more supporting databases, as well as software applications, APIs, and other tools for sending queries, reading or updating data, executing searches, and otherwise interacting with data stored in the databases.

In one or more embodiments, the server 70 is coupled to or in communication with one or more tools used to locate and dispatch trains. For example, the server 70 can include tools such as train control systems, event processors, message routers, and a geographic information system (GIS). The GIS can capture, store, analyze, and manage geographic data about the location of assets, both fixed and moving, in a rail network. The GIS can present such data on a display in conjunction with a map of the environment. The GIS may include location information (e.g., latitude, longitude, and elevation) about every switch, crossing, control point, station, track segment (e.g., speed rating or limit, zone identifier, curvature, and the like), and other assets throughout the rail network. In some networks, the GIS can process and manage information about tens of thousands of operating stations. The GIS can include software applications, APIs, and other tools that allow users to create and send queries, read the data, update or delete the data, execute searches, and otherwise interact with the geographic data. According to some example implementations, the GIS and the geospatial position and coordination system 260, as described herein, can determine a current location 660 of one or more locomotives 10 in the rail network.

The dispatcher 80 can include trained personnel (e.g., system administrators, dispatch clerks) as well as automated dispatching tools and applications for processing, monitoring, and otherwise controlling rail traffic and maintenance activities. The system 100 can prepare and broadcasts an alarm signal 710 to field personnel 90 in response to detecting one or more defects in a current track geometry profile, as described herein.

In certain embodiments, the track profile sensor assembly 300 includes camera systems 310L and 310R positioned to capture images of the track 20. The track profile sensor assembly 300 can include at least one or more camera systems. For example, the track profile sensor assembly 300 can include more than two camera systems 310L and 310R. The track profile sensor assembly 300 can include an inertial measurement unit (IMU) 320 (see FIG. 5) for detecting motion data associated with the locomotive 10. The track profile sensor assembly 300 can be supported within a weather-resistant enclosure 400 (see FIG. 5). The weather-resistant enclosure 400 can include the camera systems 310L and 310R within side compartments and positioned to capture images of the track 20.

In one or more embodiments, the IMU 320 includes an accelerometer, a gyroscope, and a magnetometer. The motion-sensing components of the IMU 320 may be micro-electro-mechanical systems (MEMS) that have microscopic moving parts, often small enough to be part of a microchip. The accelerometer can sense the linear acceleration of the locomotive 10 (including the acceleration due to gravity) relative to three orthogonal axes (x, y, z). The gyroscope can sense the angular velocity of the locomotive 10 about three axes of rotation (pitch, roll, yaw). The accelerometer and gyroscope can provide position, orientation, and motion data about the device relative to six axes (x, y, z, pitch, roll, yaw). The magnetometer can sense the heading of the locomotive 10 relative to magnetic north. The position of the locomotive 10 may be determined by location sensors, such as the geospatial position and coordination system 260, one or more transceivers to generate relative position coordinates, altitude sensors or barometers, and other orientation sensors.

The IMU 320 can include a digital motion processor that gathers the raw data from the components and computes a number of useful values about the position, orientation, and motion of the locomotive 10. For example, the acceleration data gathered from the accelerometer can be integrated to obtain the velocity relative to each axis (x, y, z); and integrated again to obtain the position of the locomotive 10 (in linear coordinates, x, y, and z). The angular velocity data from the gyroscope can be integrated to obtain the position of the locomotive 10 (in spherical coordinates). The programming for computing these useful values may be stored in memory and executed by a processor of the onboard data acquisition system 200.

In various embodiments, the data acquisition system 200, includes a processor for executing instructions and a memory for storing instructions (e.g., applications, software programs). The data acquisition system 200 can be in communication (e.g., preferably cabled connections) with a transceiver 210 for wireless communications, the track profile sensor assembly 300, a velocity sensor 250, and a geospatial position and orientation system 260.

The data acquisition system 200 can draw power from the locomotive 10 for all the onboard elements of the track inspection system 100. The data acquisition system 200 can include one or more uninterruptible power supply (UPS) units and other circuitry for controlling and otherwise regulating the power supplied to the system 200, especially during startup and shutdown. The system 200 may draw power from the locomotive 10 and its batteries on a constant basis, even when the locomotive powers down or engages a 'night switch' to disconnect from the batteries. The UPS units and other circuitry can protect the onboard elements of the track inspection system 100 by providing a regulated and consistent power supply.

In one or more embodiments, the velocity sensor 250 includes a magnetic incremental rotary encoder coupled to a free end of one of the axles of the locomotive 10 (e.g., to the center axle of three wheelsets of the forward truck). The magnetic incremental rotary encoder of the velocity sensor 250 can continuously detect changes in the rotational position of the axle. The magnetic incremental rotary encoder of the velocity sensor 250 can generate a signal output that is converted to the velocity of the locomotive 10. For example, one such magnetic incremental rotary encoder is the GEL 293 by Lenord, Bauer & Co. GmbH. The free end of the axle can include a journal box containing a set of wheel bearings to support the axle. The magnetic incremental rotary encoder, for example, can include a bearing plate that is sized and shaped to align with the wheel bearings in the journal box.

In some embodiments, the geospatial position and orientation system 260 includes a power supply coupled to a position processor, an inertial measurement unit (IMU), and a roof-mounted global navigation satellite system (GNSS) antenna that communicates with GPS satellites 60. For example, one such geospatial system 260 with an integrated IMU is the Applanix POS LV position and navigation system. In particular embodiments, the IMU which is part of the geospatial system 260 is placed inside the enclosure 400 and functions as the onboard IMU 320 of the train inspection system 100. Because the IMU 320 is integrated with the geospatial system 260, the IMU 320 can provide position and orientation data, even if the link to the GPS satellites 60 is temporarily interrupted or lost.

The train inspection system 100 can include a track geometry evaluator 1045. The track geometry evaluator 1045 is a software application configured to determine a current track profile based on data from the left camera system 310L, the right camera system 310R, and the IMU 320. The track geometry evaluator 1045 may store and process data locally using the onboard data acquisition system 200, the remote server 70, or a combination thereof. In at least one embodiment, the memory and processing requirements of the track geometry evaluator 1045 are shared by or distributed across the data acquisition system 200 and the remote server 70.

Figure 2:
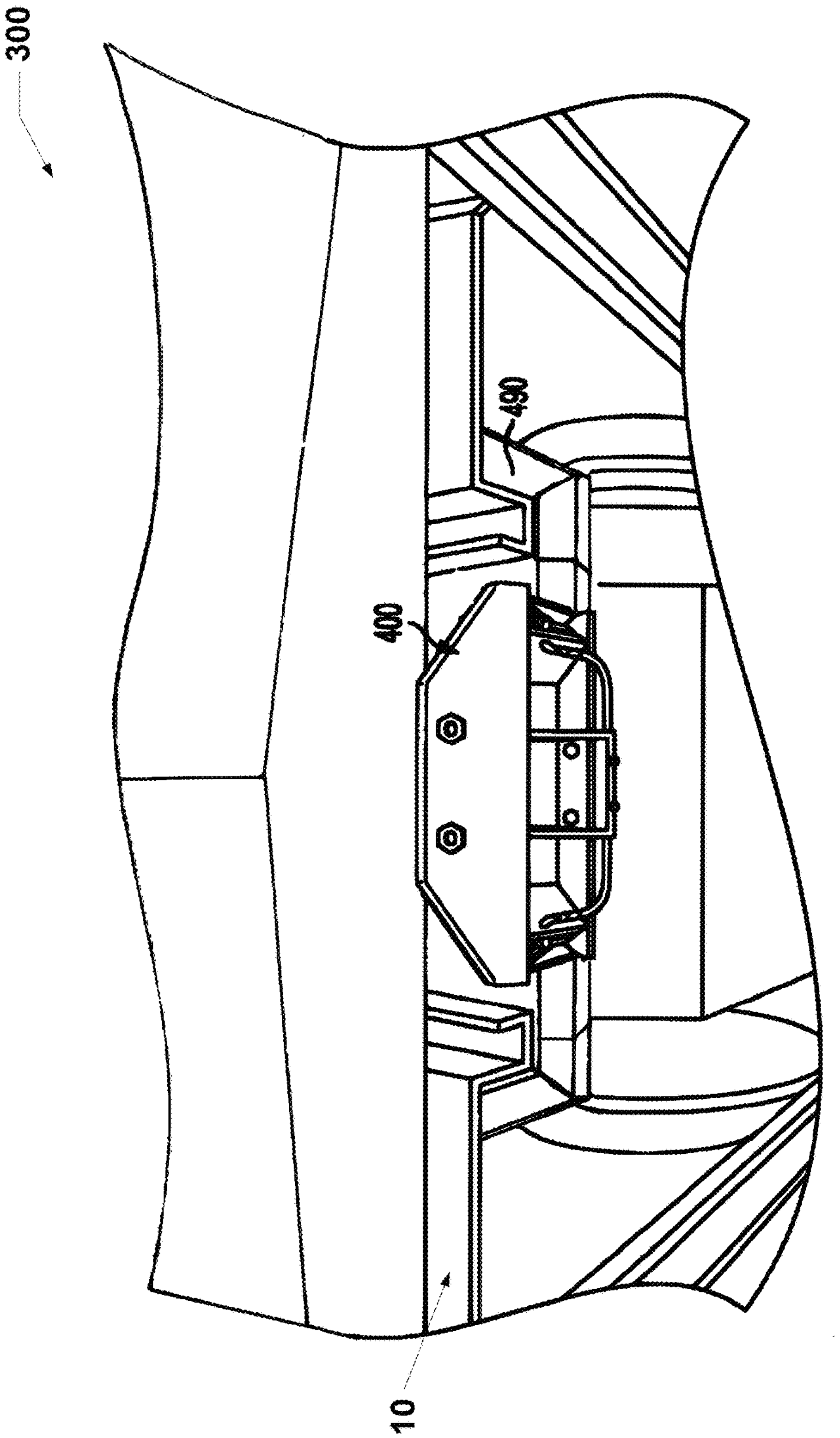
FIG. 2 illustrates a perspective view of an attached track profile sensor assembly supported by a weather-resistant enclosure, according to one embodiment of the present disclosure.

Referring now to FIG. 2, illustrated is a perspective view of the track profile sensor assembly 300 supported by a weather-resistant enclosure 400, according to at least one embodiment of the present disclosure. The weather-resistant enclosure 400 can be supported by a mounting bracket 490. In certain embodiments, the enclosure 400 is located at the front end of the locomotive 10, near the first or leading wheelset. The mounting bracket 490, for example, is attached to the forward truck of the locomotive 10, which supports two or three wheelsets.

In particular embodiments, the enclosure 400 supporting the left camera system 310L, the right camera system 310R, and the IMU 320 is attached to a forward truck of the locomotive 10. The forward truck can support two or three wheelsets and can be spring-mounted relative to the locomotive 10. Because the forward truck is spring-mounted, the data from the IMU 320 can be adjusted or corrected to remove the impact of the springs between the truck and the body of the locomotive.

Figure 3:
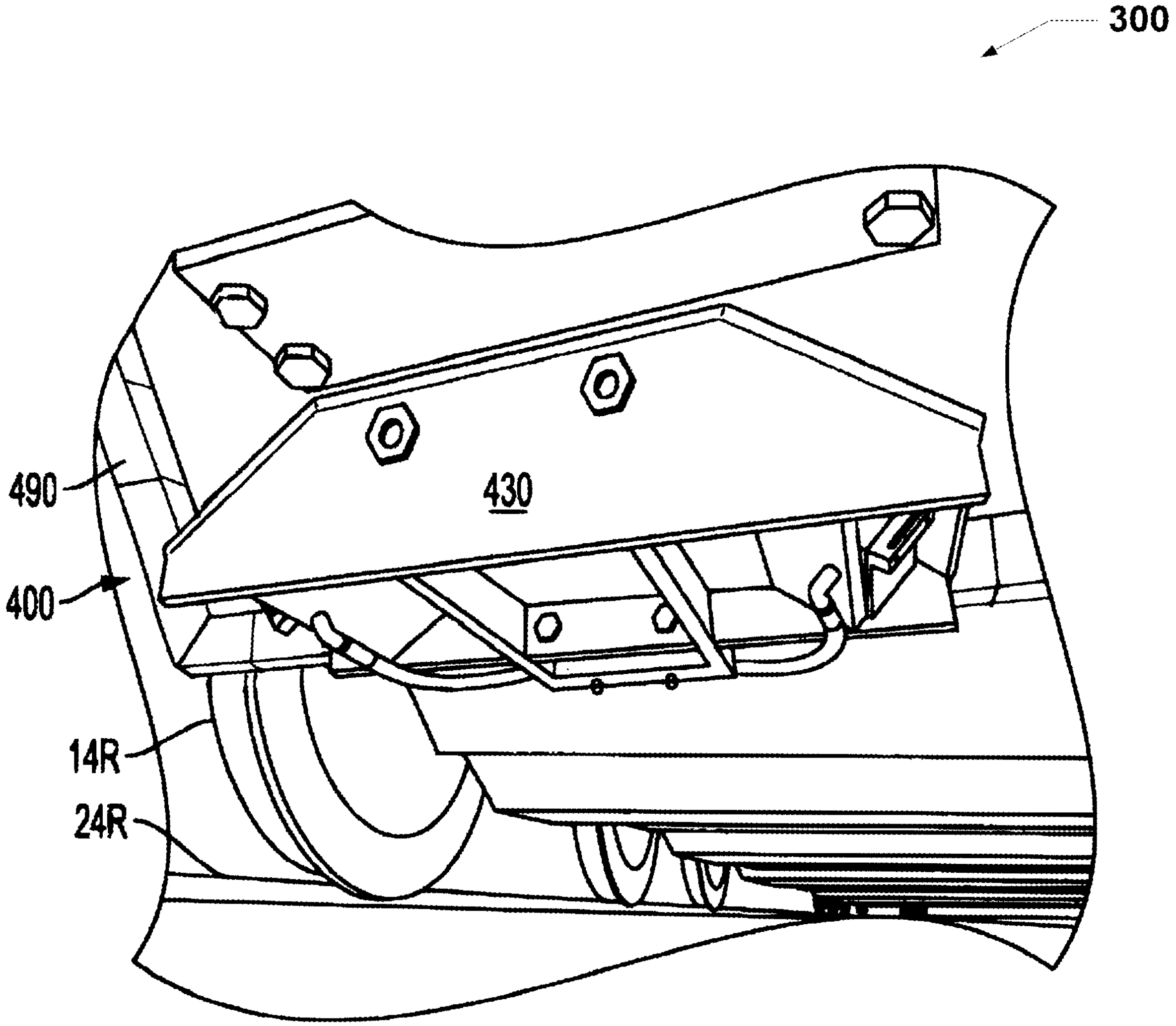
FIG. 3 illustrates an enhanced perspective view of the weather-resistant enclosure supported by a mounting bracket, according to one embodiment of the present disclosure.

Referring now to FIG. 3, illustrated is an enhanced perspective view of the weather-resistant enclosure 400 supported by the mounting bracket 490, according to at least one embodiment of the present disclosure. The enclosure 400 can be located so that the track profile sensor assembly 300 is positioned to capture images and data of the rails at or substantially close to the place and time the front wheels of the locomotive interact with the rails. For example, the track profile sensor assembly 300 can be positioned to capture images and data approximately eight to ten inches in front of the contact point between the locomotive 10 and the railway tracks 20. For example, the track profile sensor assembly 300 can measure data where the front right wheel 14R of the locomotive 10 contacts the right rail 24R. Although the forces exerted by the locomotive 10 may reach a maximum exactly at the wheel-rail contact point, the forces are distributed along the railway track 20 and the data gathered just in front of the contact point can provide sufficient data to generate a track profile.

Figure 4:
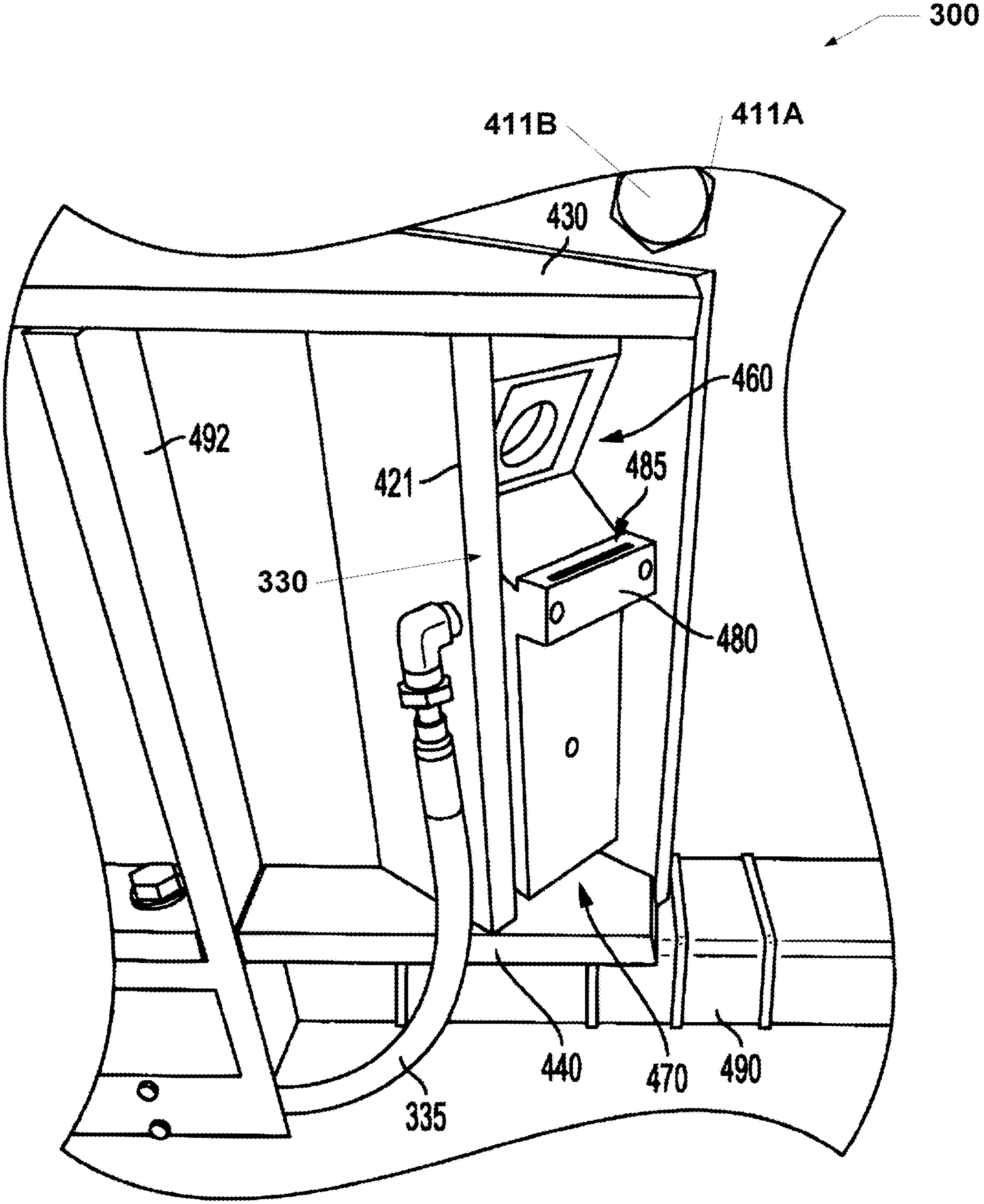
FIG. 4 illustrates a perspective bottom view of the weather-resistant enclosure, according to one embodiment of the present disclosure.

Referring now to FIG. 4, illustrated is a perspective bottom view of the weather-resistant enclosure 400, according to at least one embodiment of the present disclosure. The weather-resistant enclosure 400 can include a front plate 430 and a rear plate 440. The front plate 430 may include one or more cartridge openings 411A that are sized and shaped to receive desiccate cartridges 411B. The desiccate cartridges 411B can help reduce and maintain low humidity levels inside the central compartment where the IMU 320 is located. The desiccate cartridges 411B may include a color-based indicator or other visible indicia indicating the cartridge is at or near the ends of its usefulness.

In some embodiments, the train inspection system 100 also includes an air curtain 330 configured to direct a flow of air 331 (see FIG. 7) between the camera opening 465 and the elements. In various embodiments, the flow of air 331 is directed toward the front of the locomotive 10. The air curtain 330 can include a conduit 335 in pneumatic communication with a source of compressed air. For example, the compressed air system onboard the locomotive 10 can supply the air curtain 330, having a typical pressure of one hundred forty pounds per square inch. In some implementations, the air curtain 330 operates only when the locomotive 10 is in motion (e.g., when the detected current velocity of the locomotive 10 is not zero).

The conduit 335 can attach to an air inlet in the side floor 421. The compressed air can flow from the air inlet into a plenum 480 and then out through an air outlet 485. The compressed air can flow through part of the block 455 (See FIG. 5) to reach the plenum 480. In particular embodiments, the air outlet 485 is shaped like a generally rectangular slot and sized in length to nearly span the width of the camera recess 460. The resulting flow of air 331 may be located about three-quarters of an inch away from the camera opening 465. The pressure of the compressed air combined with the size and shape of the air outlet 485 can generate a flow of air 331 sufficient to inhibit contaminants from entering the camera recess 460. For example, the pressure of the compressed air can be regulated down to about forty-five pounds per square inch and maintains a relatively constant flow. Continuing this example, the pressure can produce a flow of air 331 through the air outlet 485 at a relatively constant velocity. In one or more embodiments, the air curtain 330 is configured to vary the pressure and velocity in response to changes in a detected current velocity 650 of the locomotive 10.

Figure 5:
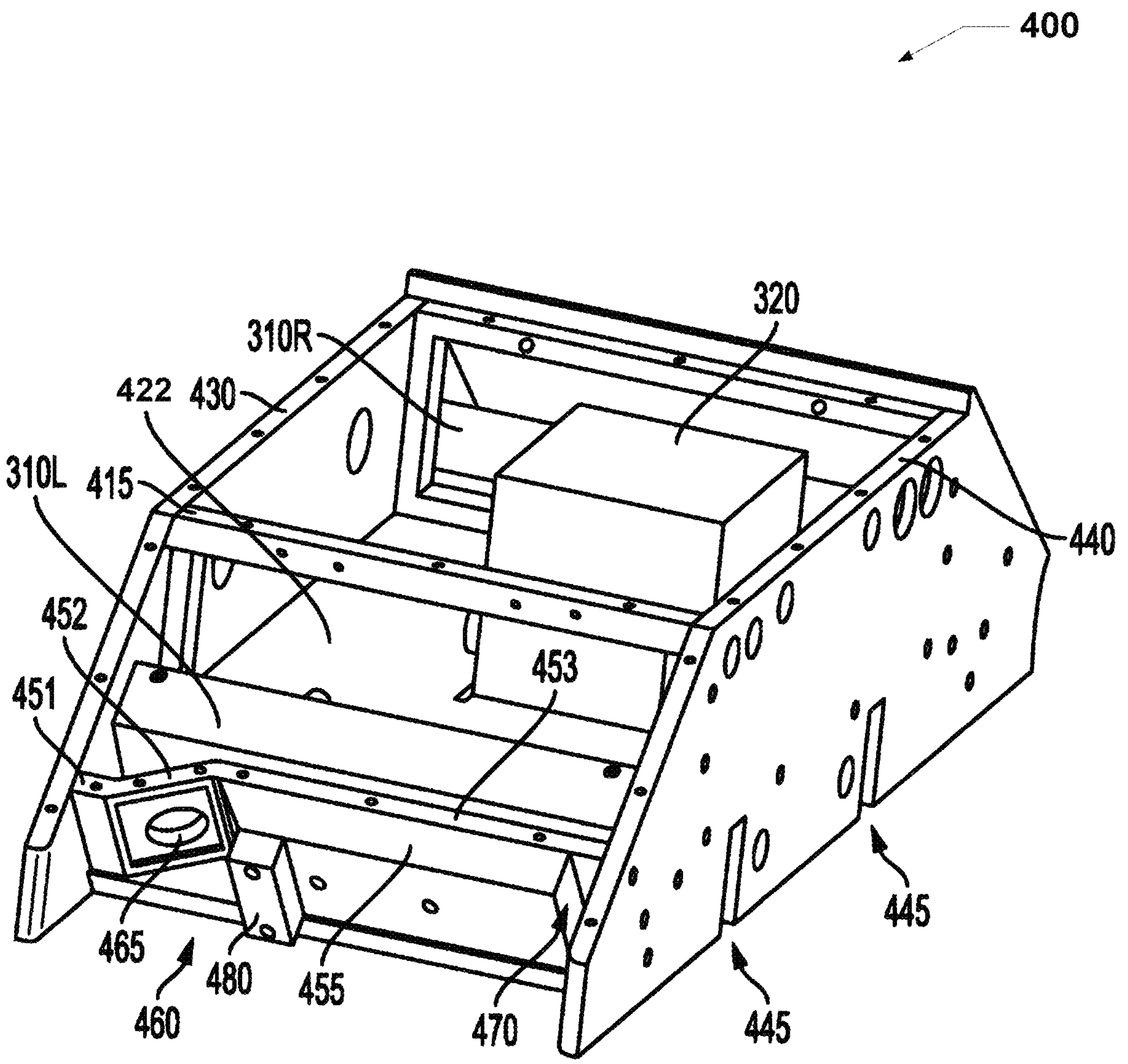
FIG. 5 illustrates a perspective view of an example weather-resistant enclosure with several upper plates removed, according to one embodiment of the present disclosure.

Referring now to FIG. 5, illustrated is a perspective view of an example weather-resistant enclosure 400 with several upper plates removed, according to at least one embodiment of the present disclosure. In at least one or more embodiments, the weather-resistant enclosure 400 is substantially weatherproof. For example, the plates and components are sealed, closely fit, or otherwise configured to inhibit the infiltration of water and other contaminants into the weather-resistant enclosure. The rear plate 440 can includes a pair of slots 445 that are sized and shaped to receive a pair of supports 492 extending from the support bracket 490. The enclosure 400 can include a side floor 421 extending at a downward angle toward the track 20 and a central floor 422. The side floor 421 can support the left camera system 310L.

The camera systems 310L and 310R can include a camera, a laser projector, and a signal processor. The laser can project a reference line onto the surface of the rail. The camera can capture an image and/or video of the projected reference line. The signal processor can generate a three-dimensional representation of the rails profile based on the captured images. The camera systems 310L and 310R can produce a highly accurate rail profile using triangulation; the camera systems 310L and 310R can be positioned at a known triangulation angle and at a fixed distance relative to the laser projector. One such system is the MLWL273 Profile Sensor by Wenglor Sensoric GmbH.

The left camera system 310L may rest against a side wall that includes a first orthogonal portion 451, an angled portion 452, and a second orthogonal portion 453. The side wall may be supported by a block 455, as shown. The angled portion 452 can include a camera opening 465 that is aligned with the lens of the camera of the left camera system 310L. The camera opening 465 may be covered with glass or another material to protect the lens. In at least one embodiment, the angled portion 452 create a camera recess 460. The camera recess 460 can protect the camera opening 465 and inhibits contamination by flying debris, dust, water, and environmental elements.

The left camera system 310L can be supported by a second orthogonal portion 453 of the side wall. The second orthogonal portion 453 can be supported by a block 455. The block 455 can be sized and shaped to create a laser recess 470 near the rear wall 440 of the enclosure 400. The laser recess 470 can coincide with the location of the internal laser projector of the left camera system 310L.

Figure 6:
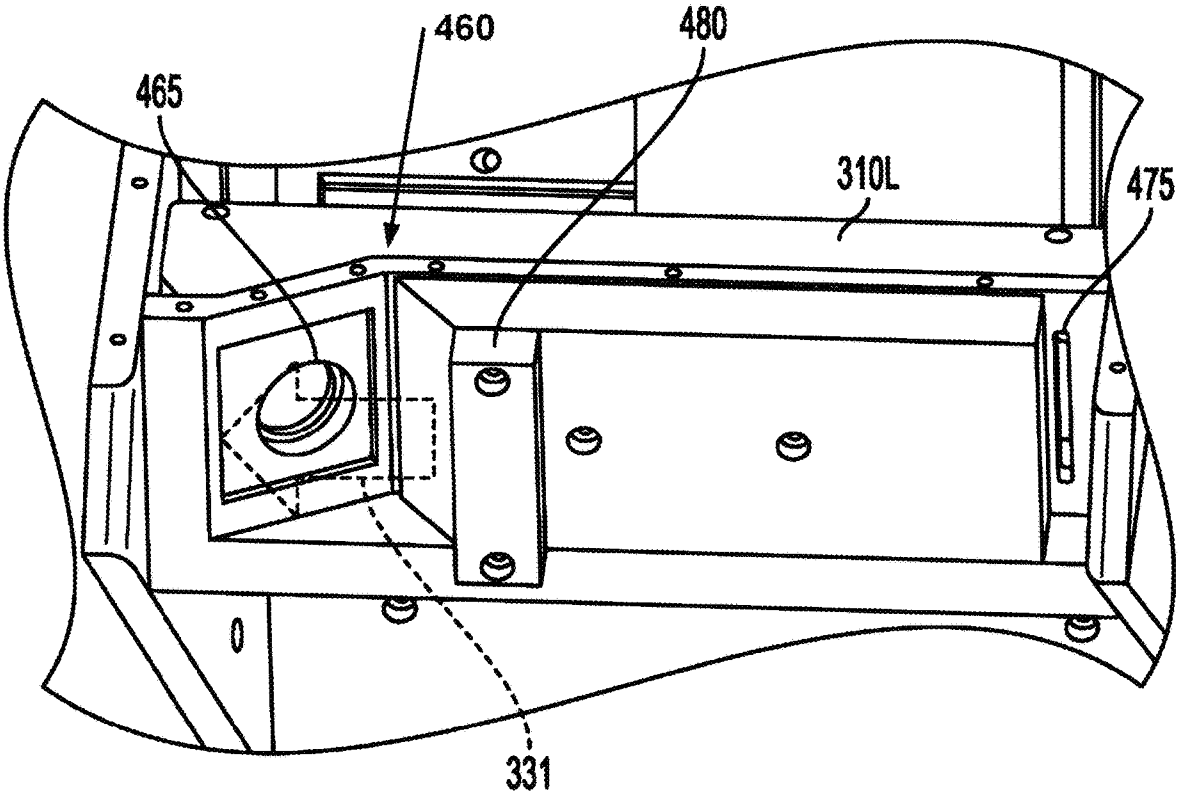
FIG. 6 illustrates a perspective view of an example camera system supported by an enclosure, according to one embodiment of the present disclosure.

Referring now to FIG. 6, illustrated is a perspective view of an example mounting bracket to support the weather-resistant enclosure, according to one embodiment of the present disclosure. The second orthogonal portion 453 of the side wall can include a laser opening 475 that is size and shaped to align with the laser projector. The laser opening 475, in some implementations, is shaped like a generally rectangular slot, as shown, and may be covered with glass or another material to protect the laser projector. The laser recess 470 protects the laser opening 475 and inhibits contamination by flying debris, dust, water, and environmental elements.

In operation, the left camera system 310L can project a laser through the laser opening 475, through the laser recess 470, and directly onto the surface of the rail. The laser projection can create a reference line across the rail at about eight to ten inches in front of the wheel-rail contact point.

The camera can be oriented at a fixed triangulation angle relative to the laser projector. Relative to the forward direction of travel of the locomotive 10, the camera and camera opening 465 can be located ahead or forward of the laser and laser opening 475. For example, the camera can be oriented at a rearward angle to capture an image of the laser reference line on the surface of the rail.

Figure 7:
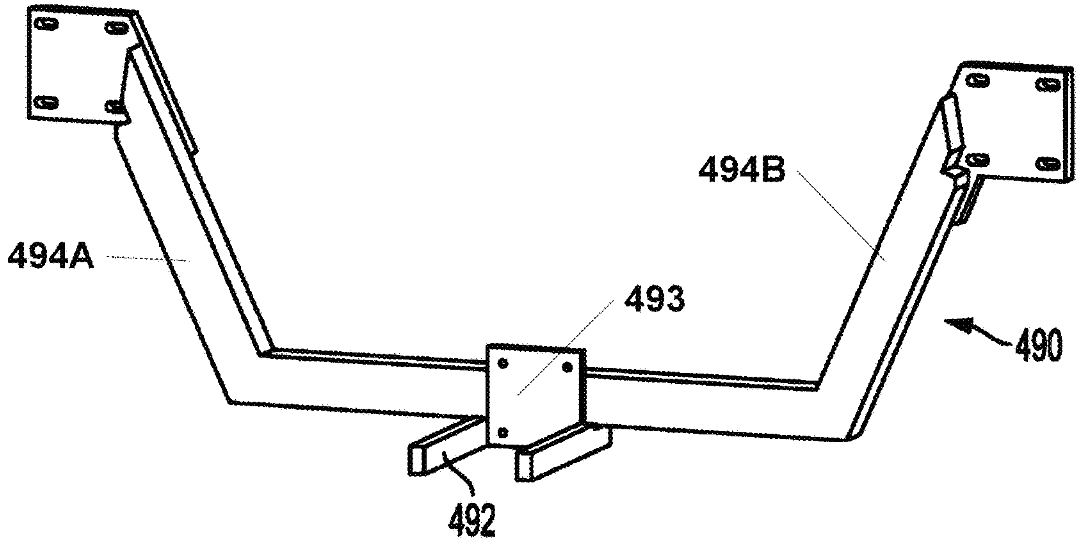
FIG. 7 illustrates a perspective view of an example mounting bracket to support the weather-resistant enclosure, according to one embodiment of the present disclosure.

Referring now to FIG. 7, illustrated is an example support bracket 490, according to at least one embodiment of the present disclosure. The support bracket 490 can be made of rectangular steel tubing and includes a central body 493 and a pair of angled portions 494A-B extending upward from the central body to plates that are sized and shaped to attach to the forward truck of a locomotive. For example, the central body is about forty-eight inches in length. The support bracket 490 can include a central plate and a pair of supports 492 extending away from the central body of the bracket 490. In various embodiments, the supports 492 are approximately eight inches in length.

Figure 8:
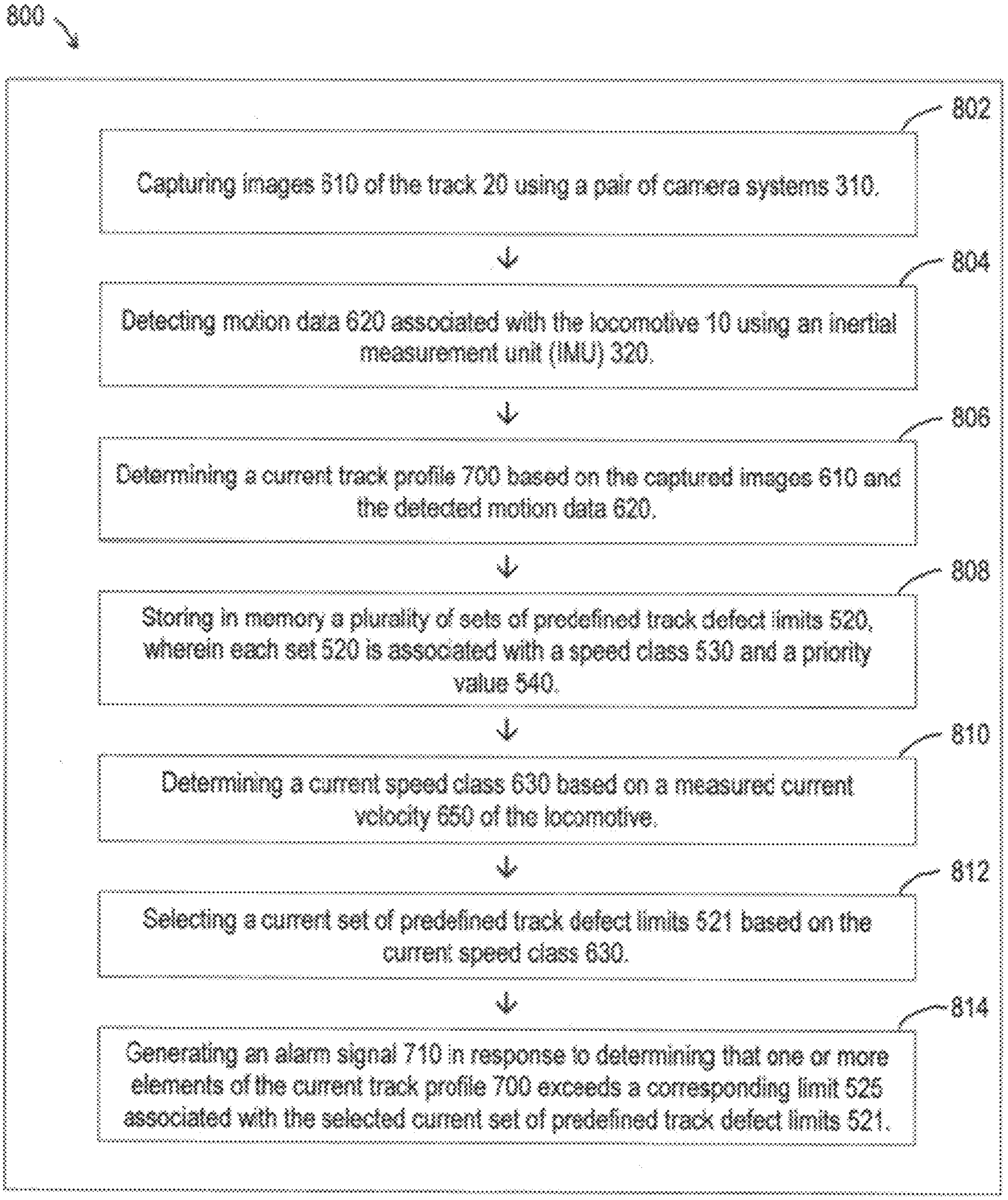
FIG. 8 illustrates a flowchart of a process for sounding an alarm based on received data, according to one embodiment of the present disclosure.

Referring now to FIG. 8, illustrated is a flow chart of the process 800 for generating an alarm signal 710 based on the data gathered by the train inspection system 100, according to one embodiment of the present disclosure. One or more of the steps shown and described may be performed simultaneously, in a series, in an order other than shown and described, or in conjunction with additional steps. Some steps may be omitted or, in some applications, repeated.

At block 802, the process 800 can include capturing images 610 of the railway track 20 using the cameras systems 310L and 310R. As described herein, each camera system/device 310L and 310R can include a laser-camera system that generates a three-dimensional representation of each rail profile (based on the captured images 610). As an example, a laser projector of each camera system 310L and 310R can emit a laser in a direction of the railway track and receive a reflection of the laser via camera sensors. The system can identify distances for objects captures in an image of a segment of the railway track. The system can identify the distance based on a known distance of the laser from the railway track and a known angle for use in triangulation. The system can generate a three-dimensional representation with object sizes and distances being determined using the identified distances. In various embodiments, each camera systems 310 generates a rail profile.

At block 804, the process 800 can include detecting motion data 620 associated with the locomotive 10 using the inertial measurement unit (IMU) 320. The train inspection system 100 can use the detected motion data 620 to calculate particular elements of the current track profile (e.g., cant angle, cross level, warp; especially on a curve or grade). The motion data 620 can be detected during a time period corresponding to when an image is captured in block 802. In some embodiments, the time period can include a particular time plus or minus a configured count of seconds, minutes, or other time. In other embodiments, the time period can correspond to a time between a start and end time for which the locomotive traverses a particular distance of track (e.g., 50 feet). In In some embodiments, the train inspection system 100 may be unable to calculate the particular elements of the current track profile using captured images or rail profiles alone. As an example, the train inspection system 100 may utilize location data and known mapping data for the current location to generate the particular elements of the current track profile. In some embodiments, the system can compare the motion data 620, captured images and/or rail profiles to historical motion data 620, captured images, and/or rail profiles for a same location and stored in data store to determine the current track profile.

In some embodiments, the motion data 620 can include temperature and humidity values, audio captured of the locomotion during movement, force data experienced by the locomotive (e.g., forces from turning, hitting an obstruction, increasing or decreasing elevation, etc.), pathing information, location information, velocity of travel, vibration information, and other data. The system can capture the motion data 620 by a variety of sensors.

At block 806, the process 800 can include determining a current track profile 700 based on the pair of rail profiles (generated from the captured images 610) and the detected motion data 620. In at least one embodiment, the elements of the current track profile 700 to be measured or calculated are based on the elements, standard formulas, and calculation methods set forth in the FRA regulations. For example, the FRA regulations can include the track safety standards. The train inspection system can analyze the data from the IMU 320, the camera systems 310L and 310R, and the geospatial system 260 to determine the current track profile 700.

At block 808, the process 800 can include storing in memory a plurality of sets 520 of predefined track defect limits. In various embodiments, each set 520 is associated with a speed class 530 and an urgency value 540 (see FIG. 11). The defect limits can vary according to the speed class 530 (e.g., Class 1, 2, 3, and 4) based on the current velocity of the locomotive 10. If a defect is detected, the train inspection system 100 can associate the alarm signal 710 with an urgency/priority value 540 (e.g., Priority or Red Letter). The urgency value can vary based on the relative severity of the defect. The plurality of sets 520 of predefined track defect limits can be stored in memory on the data acquisition system 200 onboard the locomotive 10 or on the remote server 70 (or both).

The track geometry evaluator 1045 can receive the sets 520 of predefined track defect limits. The track geometry evaluator 1045 can include instructions or is otherwise configured to determine whether to generate an alarm signal 710 by comparing the current data (e.g. speed data, motion data 620, location information, images of the railway track, visual representations of the railway track, etc.) associated with a locomotive to the sets 520 of predefined track defect limits. The track geometry evaluator 1045 can determine that the train is operating outside of allowed parameters when the current data includes details that exceed the allowed limits defined in the sets 520 of predefined track defect limits (e.g., a particular cant exceeds allowed specifications).

At block 810, the process 800 can include the track geometry evaluator 1045 determining a current speed class 630 based on the current velocity 650 measured by the velocity sensor 250 on the locomotive 10. For example, the measured current velocity 650 may be between twenty-six and forty miles per hour; in response, the track geometry evaluator 1045 can determine that Class 3 is the current speed class 630.

At block 812, the process 800 can include the track geometry evaluator 1045 selecting a current set 521 of predefined track defect limits that is associated with the current speed class 630 (e.g., Class 3).

At block 814, the process 800 can include the track geometry evaluator 1045 determining whether any one (or more) elements of the current track profile 700 exceeds a corresponding limit 525 in the current set 521 of predefined track defect limits. The measured element (e.g., track gage)

can be compared to the corresponding limit 525 (e.g., the defect limits associated with track gage). In the FRA regulations, track gage can be defined as the distance between the rails, measured along a plane five-eighths inch below the top of the rail. For example, the current track gage is one of the elements of the current track profile 700. For a current track gage measured to be about one and one-tenth inches, the corresponding track gage limit 525 (shown in FIG. 11) can be one inch. In response to determining that the current track gage exceeds the corresponding track gage limit 525, the track geometry evaluator 1045 can generate an alarm signal 710. The alarm signal 710 in this example would be associated with an urgency value 540 of "Priority" because the defect is above a Priority limit 540A but less than a Red Letter limit 540B.

The alarm signal 710 can include data about the particular defect, the corresponding limit 525 exceeded, the urgency value 540, and the current location 660 of the locomotive 10 where and when the defect was detected. In at least one embodiment, the alarm signal 710 is transmitted accompanied by data specifying a predefined span of track relative to the current location 660 (e.g., plus and minus three hundred feet on either side of the current location 660 where the defect was detected). The predefined span of track relative to the current location 660 can indicate the geographical location the defect was detected.

In some implementations, the alarm signal 710 is associated with an urgency value 540 of Red Letter Limit 540B if the defect is detected on or near a critical structure. Critical structures can include, for example, a tunnel or bridge. The train inspection system 100 can determine the critical structure based on the detected current location 660 of the locomotive 10.

In some embodiments, the generated alarm signal 710 is broadcast using the transceiver 210 via the network 50 to one or more remote servers 70 and dispatchers 80. The broadcast may be executed continuously or periodically, in sets (e.g., once every minute). The dispatcher 80, in some embodiments, includes a system administrator who reviews and interprets the data including the alarm signal 710, compares it to a known map of the rail system, and determines which field personnel 90 should be notified to schedule or execute a possible repair or take other remedial action. For example, a dispatcher 80 may receive an alarm signal 710 about a defect along a high-speed Class 4 segment of track. A review of the GIS data and rail network information may reveal that the track segment is actually in a lower-speed Class 1 zone and, thus, the detected defect may be less than the threshold limit; in which case, the alarm signal 710 may be safely ignored. In other implementations, the track inspection system 100 transmits the alarm signal 710 directly to field personnel 90 for further action.

Even if an alarm signal 710 is not generated, the track geometry evaluator 1045 can store in memory and transmit to the server 70 the current track profiles 700 (with the current locations 660 and other data) for later analysis. The train inspection system 100 can transmit data at any particular interval of time. For example, an element (e.g., track gage) may be degraded and therefore of concern to maintenance personnel even if the element does not exceed its corresponding defect limit 525. Continuing this example, the track gage may be nine-tenths of an inch, which is near but does not exceed the defect limit 525 of one inch. Such a degradation can likely increase over time and, therefore, would be of interest to the maintenance personnel. In some embodiments the maintenance personnel can schedule maintenance or other remedial measures on this section of track before the element exceeds the defect limit 525.

The alarm signal 710 may include an audible alarm emitted by the data acquisition system 200 to alert onboard personnel. The data acquisition system 200 onboard the locomotive 10, in some implementations, includes a graphical user interface (GUI) on a display component, accessible by onboard personnel.

In use, the track inspection system 100 described herein, on a locomotive in service, can inspect long segments of track during regular service trips. For example, the system 100 on the locomotive 10 may inspect a thousand-mile segment of track four times in a week, whereas a hi-rail truck or geometry car might inspect the same track segment only three or four times in a year. In this aspect, the track inspection system 100 can provide a more frequent inspection-under realistic service conditions-compared to previously used inspection systems and methods.

Figure 9:
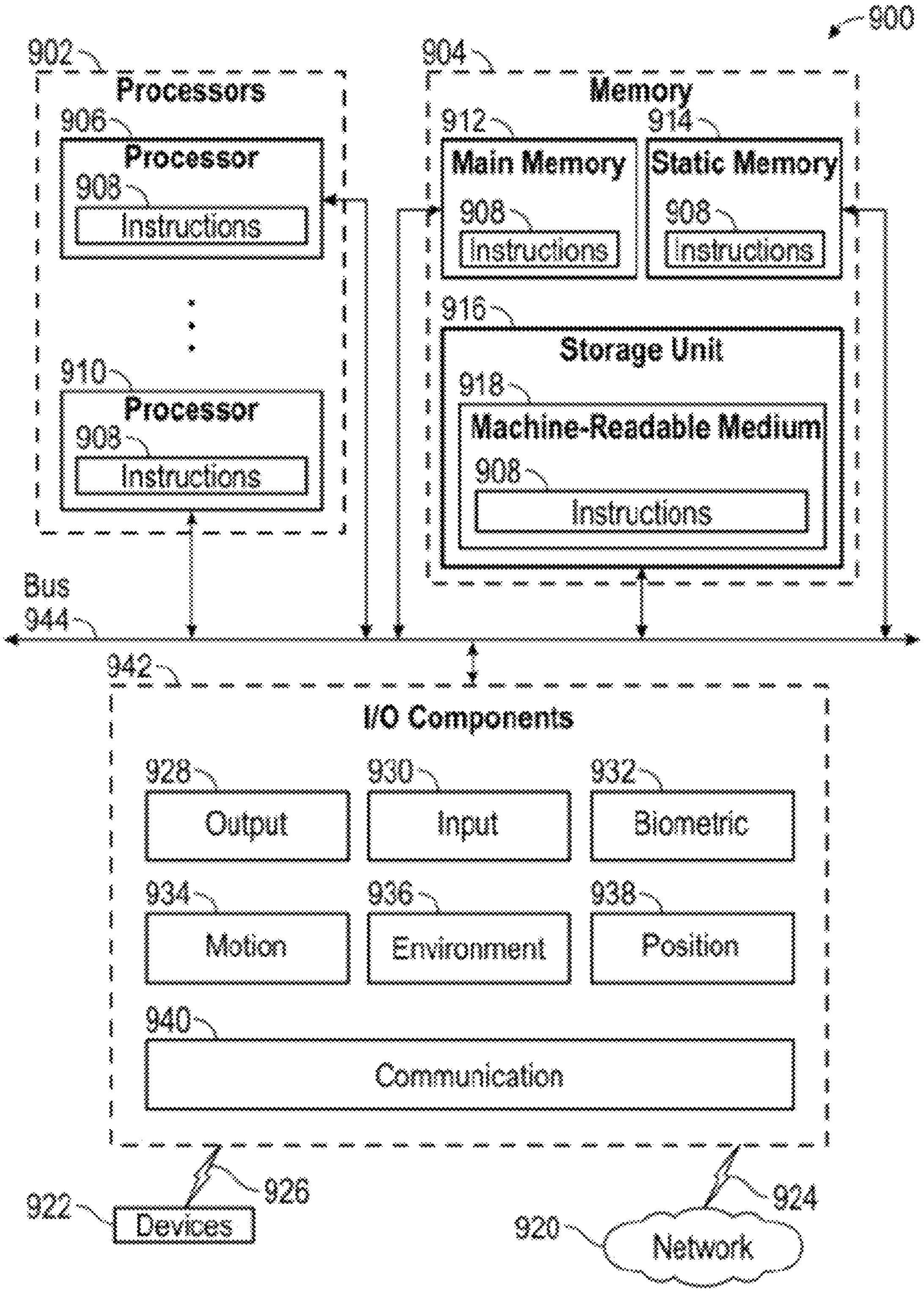
FIG. 9 illustrates a computing environment, according to one embodiment of the present disclosure.

FIG. 9 is a diagrammatic representation of an example hardware configuration for a computing device such as a server. The machine 900, as shown, includes one or more processors 902, memory elements 904, and input-output components 942, all connected by a bus 944. The instructions 908 (e.g., software, a program, an application, an applet, an app, or other executable code) cause the machine 900 to perform any one or more of the methodologies described herein. For example, the instructions 908 may cause the machine 900 to execute any one or more of the methods and applications described herein. The instructions 908 transform the general, non-programmed machine 900 into a particular machine 900 that is programmed to carry out the described and illustrated functions in the manner described.

The machine 900 may operate as a standalone device or may be coupled (i.e., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and input/output (I/O) components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 5. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 930 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or to other devices 922. For example, the communication components 940 may include a network interface component 924 or another suitable device to interface with a network 920 (e.g., a wide-area network (WAN) or a public network such as the internet). Another type of interface 926 may be used to interface with other devices 922, which may be another machine or any of a wide variety of peripheral devices (e.g., a peripheral device coupled via a USB). In further examples, the communication components 940 may include wired communication components, wireless communication components, cellular communication components, Near-field Communication (NFC) components, Bluetooth® components (e.g., Bluetooth® Low Energy), Wi-Fi® components, and other components to provide communication via other modalities.

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
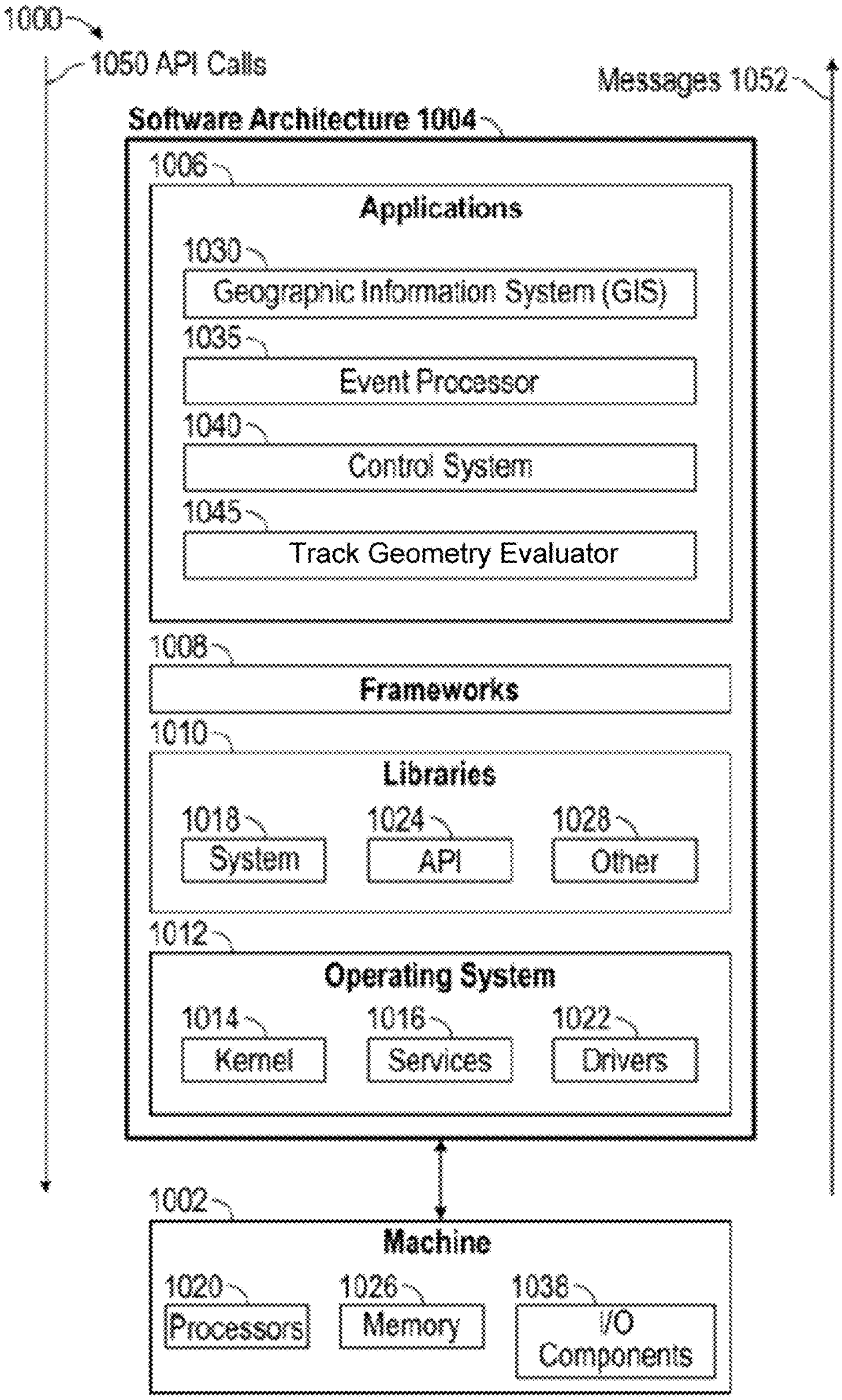
FIG. 10 illustrates a software architecture, according to one embodiment of the present disclosure.

FIG. 10 is block diagram 1000 illustrating an example software architecture 1004. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as applications 1006, frameworks 1008, libraries 1010, and an operating system 1012.

Operationally, the applications 1006 invoke API calls 1050 through the software stack and receive messages 1052 in response to the API calls 1050. An application programming interface (API) in some instances is a software-based intermediary that allows devices or applications to communicate with others. Different APIs can be designed and built for specific purposes. An API Call 1050 is a query or request for information. For example, a mobile device may execute and send an API Call 1050 to a particular application on the mobile device, which processes the query and returns a result (referred to as an API Message 1052). In another example, a server may send an API Call 1050 requesting the configuration attributes associated with a particular application to a remote mobile device, which processes the query and returns a result including the attributes to the server. The term API is also used sometimes to describe discrete functions or features associated with an application.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, Bluetooth® or Bluetooth® Low Energy (BLE) drivers, flash memory drivers, serial communication drivers (e.g., Universal Serial Bus (USB) drivers), Wi-Fi® drivers, audio drivers, power management drivers, and so forth.

The libraries 1010 can provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQL or SQLite to provide various relational database functions), web libraries (e.g., a WebKit® engine to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 include a geographic information system 1030, an event processor 1035, a control system 1040, and other applications 1045. Various programming languages can be employed to create one or more of the applications 1006, structured in a variety of manners, such as object-oriented programming languages (e.g., Objective-C, Java, or C++) or procedural programming languages (e.g., C or assembly language).

Referring now to FIG. 11, illustrated is a table showing a plurality of example sets of predefined track defect limits 540, according to one embodiment of the present disclosure and as would be understood by those skilled in the art of the railroad industry. The defect limits 540 can be categorized by sets 520 and speed classes 530. For example, the current set 521 is associated with speed class 3 (e.g., speeds between 26 and 40 miles per hour). Each set 520 is associated with the urgency value 540. For example, a Priority limit 540A is less severe than a Red Letter limit 540B. The corresponding limit 525 can denote the threshold value for categorizing particular defects including twists, curvature, and cants, among others.

According to one illustrative example, the system can identify a cant in the current track profile 700. The system can determine the locomotive is operating between 1 and 15 miles per hour. The system can determine that the rate of change in elevation (height) between the two rails or edges for a 50 ft. area is 3.5 degrees to the right (e.g., based on the current track profile 700 generated by processing the motion data 620 and image data). Further, the system can determine that the 3.5 degree cant right exceeds the 3 degree cant allowed according to the predefined track defect limits 540, and generate take a remedial action in response (e.g., generating an alarm, generating a message, rendering an indicator on a map at the current location, reduce a speed of the train, generate a request for a track to be visually inspected, indicate that the track should be shutdown to prevent future travel until inspected, etc.). The system can generate one or more overlays for a map of railway tracks that includes one or more indicators at locations corresponding to where alarms have been generated by one or more locomotives.

Figure 12:
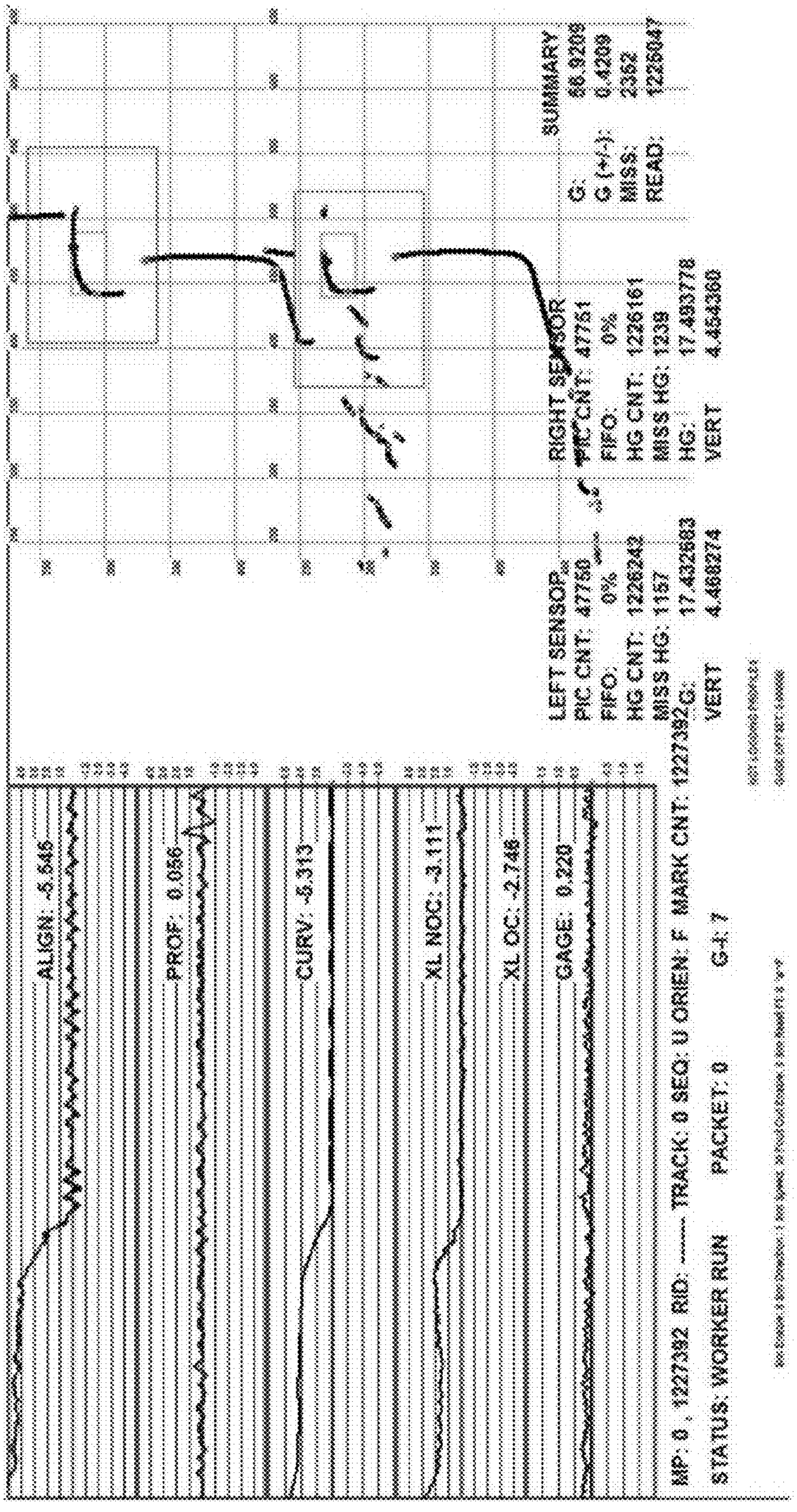
FIG. 12 illustrates an exemplary display of the data used to generate the current track profile, according to one embodiment of the present disclosure.

Referring now to FIG. 12, illustrated is an exemplary display of data 1200 used to generate the current track profile 700, according to one embodiment of the present disclosure. The track profile 700 may be presented on a display of the onboard data acquisition system 200 or on a display associated with the server 70 (or both). For example, the track profile 700 can be displayed on the server 70 to the dispatcher 80.

Figure 13:
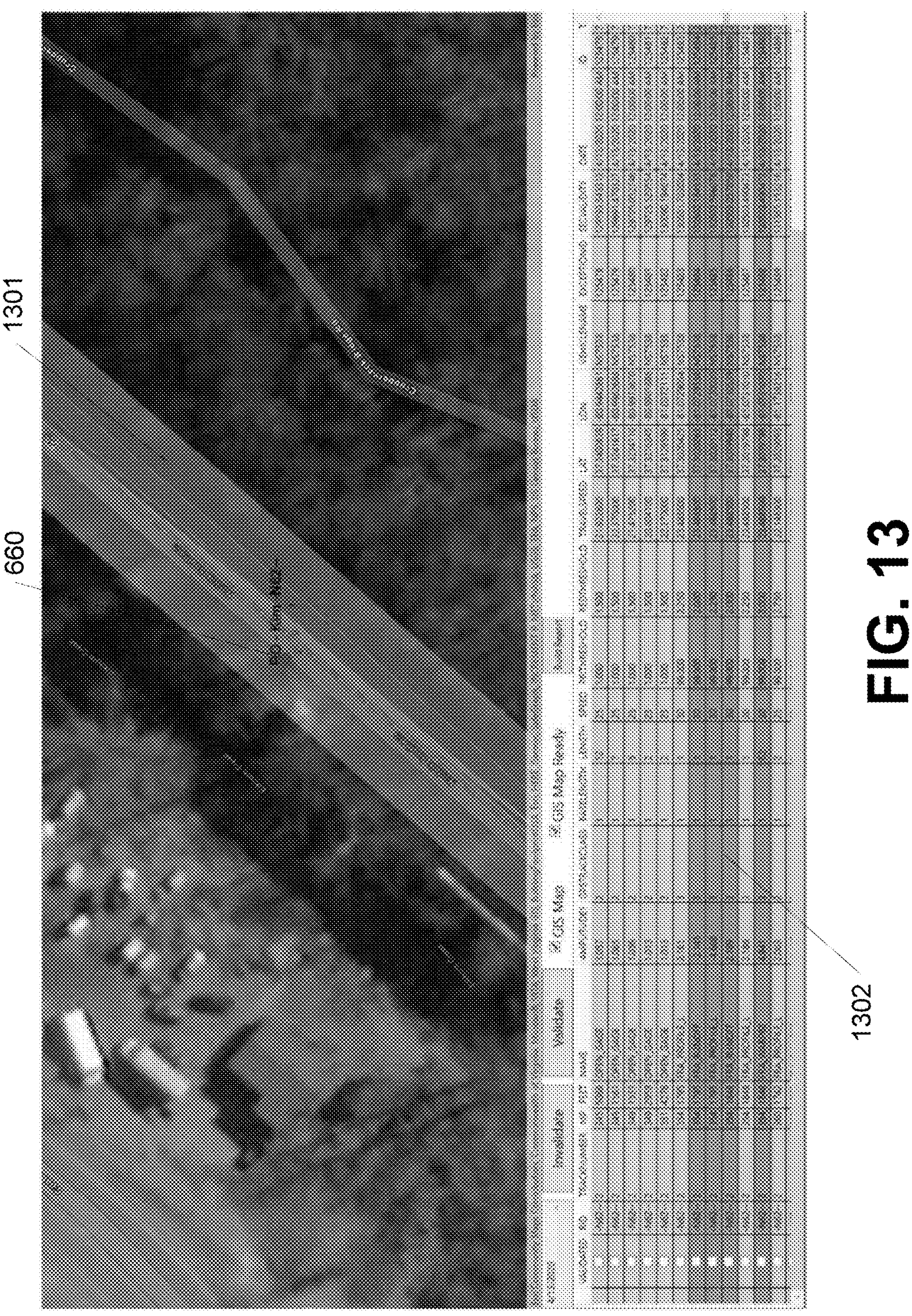
FIG. 13 illustrates exemplary data, including possible alarm signals, as presented on a display for viewing by a dispatcher, according to one embodiment of the present disclosure.

Referring now to FIG. 13, illustrated is an exemplary set of data, including possible alarm signals 710, presented on a display associated with a remote server 70 for viewing by a dispatcher 80, according to one embodiment of the present disclosure. The exemplary data can include location information 1301, the current location 660 of the locomotive 10, and defect detections 1302. The defect detections 1302 can include all defect detected by the active train inspection system 100. The server 70 can display the location information 1301 and the current location 660 of the selected defect.

Although the one or more flowcharts may depict the operations as a sequential process, many of the operations can be performed in parallel or concurrently. In addition, the order of the operations may be rearranged. A process can be terminated when its operations are completed. The term process may correspond to method, procedure, and the like. The steps of a process or method may be performed in whole or in part, may be performed in conjunction with some or all of the steps in the same or other methods, and may be performed by or in conjunction with any of a variety of different systems, such as the systems described herein.

Any of the functionality described herein can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. The following claim concepts are intended to encompass any and all modifications and variations that fall within the scope of the disclosure.

CONCLUSION

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A track inspection method comprising:

positioning one or more imaging devices of a track profile sensor assembly on a rail vehicle, the one or more imaging devices configured to capture images of a track;

detecting, via an inertial measurement unit of the track profile sensor assembly, motion data associated with the rail vehicle;

determining, via a geolocation sensor, a current location of the rail vehicle;

capturing, via the one or more imaging devices, one or more images of the track; and determining, via a track geometry evaluator, a current track profile based at least in part on the one or more images, the motion data associated with the rail vehicle, and the current location.

2. The method of claim 1, further comprising generating, via at least one computing device, a three-dimensional representation of the track, wherein the current track profile is determined based at least in part on the three-dimensional representation of the track.

3. The method of claim 1, further comprising analyzing, via at least one computing device, the motion data associated with the rail vehicle to determine at least one element of the current track profile.

4. The method of claim 3, wherein the at least one element comprises at least one of: a cant angle, a cross level, a warp, a grade, or a curve.

5. The method of claim 1, further comprising:

determining a current velocity of the rail vehicle;

determining, via at least one computing device, a current speed class based on the current velocity of the rail vehicle;

identifying, via the at least one computing device, a particular set of track defect limits of a plurality of sets of track defect limits based on the current speed class, wherein each of the plurality of sets of track defect limits are individually associated with a respective speed class; and generating, via the at least one computing device, an alarm signal in response to determining that one or more elements of the current track profile exceeds a corresponding limit associated with the particular set of track defect limits.

6. The method of claim 1, further comprising directing, via one or more air curtains in pneumatic communication with a compressed air source, a respective flow of air between at least one corresponding imaging device of the one or more imaging devices and the track.

7. A track inspection system comprising:

one or more imaging devices positioned to capture one or more images of a track, an inertial measurement unit configured to detect motion data associated with a rail vehicle;

a geolocation sensor configured to determine a current location of the rail vehicle; and at least one computing device comprising a processor and a memory, wherein the at least one computing device is in communication with the one or more imaging devices, the inertial measurement unit, and the geolocation sensor and is configured to determine a current track profile based at least in part on the one or more images and the motion data.

8. The track inspection system of claim 7, further comprising one or more air curtains in pneumatic communication with a compressed air source, the one or more air curtains being configured to direct a respective flow of air between at least one corresponding imaging device of the one or more imaging devices and the track.

9. The track inspection system of claim 7, further comprising a data store in communication with the at least one computing device and comprising a plurality of sets of track defect limits, wherein each set of track defect limits is associated with a speed class, wherein the at least one computing device is in communication with a velocity sensor and further configured to:

determine a current speed class based on a current velocity of the rail vehicle;

select a current set of track defect limits associated with the current speed class from the plurality of sets of track defect limits; and generate an alarm signal in response to determining that one or more elements of the current track profile exceeds a corresponding limit associated with the current set of track defect limits.

10. The track inspection system of claim 7, wherein the at least one computing device is further configured to:

generate a rail profile based on the one or more images; and determine the current track profile further based on the rail profile.

11. The track inspection system of claim 7, wherein at least one of the one or more imaging devices comprises a respective laser projector positioned to project a laser reference line onto a rail and a respective camera positioned to capture the laser reference line at a known distance and triangulation angle relative to the respective laser projector.

12. The track inspection system of claim 11, wherein the one or more imaging devices and the inertial measurement unit are enclosed within a weather-resistant structure of a track profile sensor assembly.

13. The track inspection system of claim 12, wherein a housing of the profile sensor assembly comprises:

a first floor portion configured to support the inertial measurement unit;

one or more second floor portions each configured to support a respective imaging device of each of the one or more imaging devices; and one or more viewing ports each configured to permit visibility of an external environment for a respective imaging device of each of the one or more imaging devices.

14. The track inspection system of claim 7, wherein a lens of the one or more imaging devices is positioned between approximately eight inches and approximately ten inches in front of a contact point between the rail vehicle and the track.

15. A method comprising:

capturing, via at least one imaging system, at least one image of a railway track;

detecting, via an inertial measurement unit, motion data associated with a rail vehicle;

determining, via at least one computing device, a current track profile based on the at least one image and the motion data;

identifying, via the at least one computing device, a set of one or more defect limits based at least in part on a current speed of the rail vehicle; and determining, via the at least one computing device, whether any element of the current track profile exceeds the set of one or more defect limits.

16. The method of claim 15, wherein determining the current track profile comprises:

identifying, via the at least one computing device, a visual representation of the railway track in the at least one image; and generating, via the at least one computing device, a three-dimensional representation of the railway track based on the visual representation.

17. The method of claim 16, further comprising identifying, via the at least one computing device, damage to a portion of the railway track based on the visual representation and the motion data.

18. The method of claim 15, wherein:

the at least one image was captured at a particular time;

the motion data was detected at the particular time; and the current speed is indicative of a speed of the rail vehicle at the particular time.

19. The method of claim 15, further comprising:

determining a plurality of current iteration track profiles over a period of time; and storing each of the plurality of current iteration track profiles in association with a respective time and a respective location corresponding to each particular current iteration track profile of the plurality of current iteration track profiles.

20. The method of claim 19, further comprising:

repeatedly identifying, via the at least one computing device and at times corresponding to the respective times of the plurality of current iteration track profiles, a current iteration set of one or more defect limits based at least in part on a current iteration speed of the rail vehicle; and generating, via the at least one computing device, a notification if at least one current iteration element of a current iteration track profile exceeds the corresponding current iteration set of one or more defect limits.

21. The method of claim 15, further comprising:

determining, via a geolocation sensor, a current location of the rail vehicle corresponding to a location at which the at least one image and the motion data were obtained; and generating, via the at least one computing device, a visual indication on a map of the railway track showing the current location of the rail vehicle.

* * * * *